United States Patent [19]
Shapiro

[11] Patent Number: 5,992,702
[45] Date of Patent: Nov. 30, 1999

[54] WATER BOTTLE FOR PETS AND THEIR OWNERS

[76] Inventor: Howard J. Shapiro, 2713 N. Magnolia, Chicago, Ill. 60614

[21] Appl. No.: 09/009,060

[22] Filed: Jan. 20, 1998

Related U.S. Application Data

[60] Provisional application No. 60/036,373, Jan. 22, 1997.

[51] Int. Cl.$^6$ ........................................................ B67D 5/06
[52] U.S. Cl. ............................ 222/205; 222/192; 222/211
[58] Field of Search ................................... 222/205, 211, 222/192

[56] References Cited

U.S. PATENT DOCUMENTS

| | | | |
|---|---|---|---|
| 4,146,154 | 3/1979 | Mastman | 222/205 X |
| 5,833,124 | 11/1998 | Groves et al. | 222/205 X |

FOREIGN PATENT DOCUMENTS

| | | | |
|---|---|---|---|
| 49772 | 11/1889 | Germany | 222/205 |
| 1 488 355 | 10/1977 | United Kingdom | 222/205 |

*Primary Examiner*—Gregory L. Huson
*Attorney, Agent, or Firm*—Foley & Lardner; Jefferson Perkins

[57] ABSTRACT

A water bottle in accordance with this invention comprises a liquid container, which may be identical to the containers presently used in known portable water bottles, and a lid assembly attached to the container and covering an upper opening therein. The lid assembly has an opening through which a flexible tube extends. The lid assembly has an upstanding wall that defines a liquid reservoir surrounding the straw separate from the liquid container. The lid assembly defines a path for the tube that is disposed exterior to an interior sidewall of the reservoir. The liquid reservoir may be filled with liquid from the container by directing the upper end of the straw into the reservoir and squeezing the container to force the liquid therein through the straw. This provides an open reservoir of liquid from which a pet can drink without contaminating the liquid within the liquid container.

7 Claims, 5 Drawing Sheets

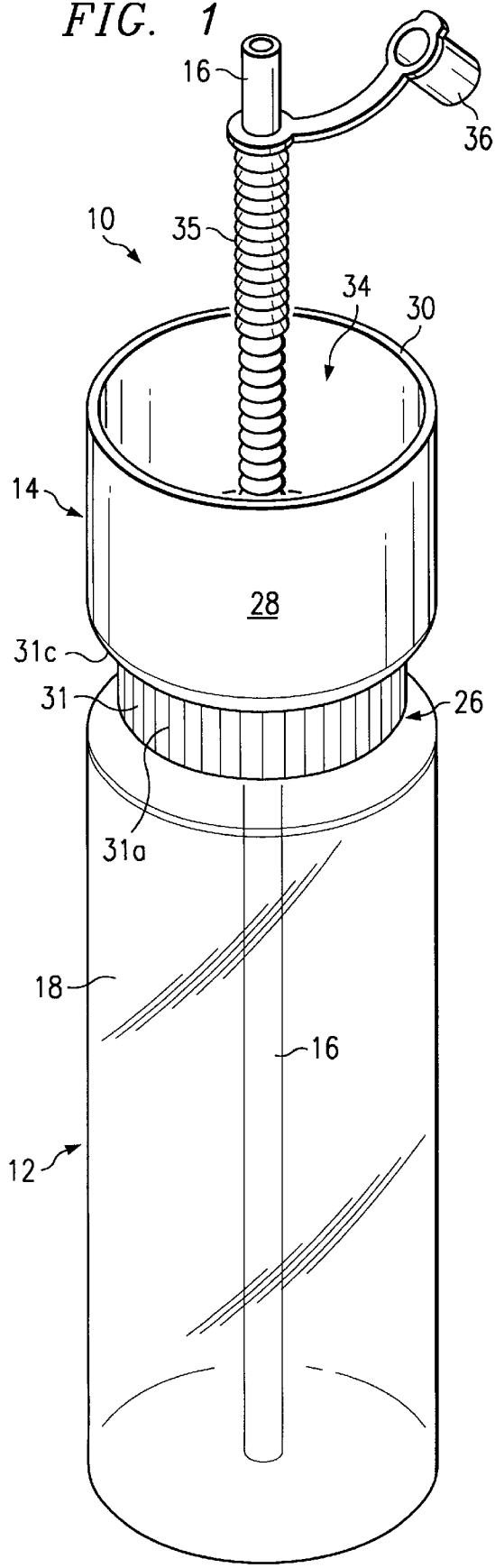
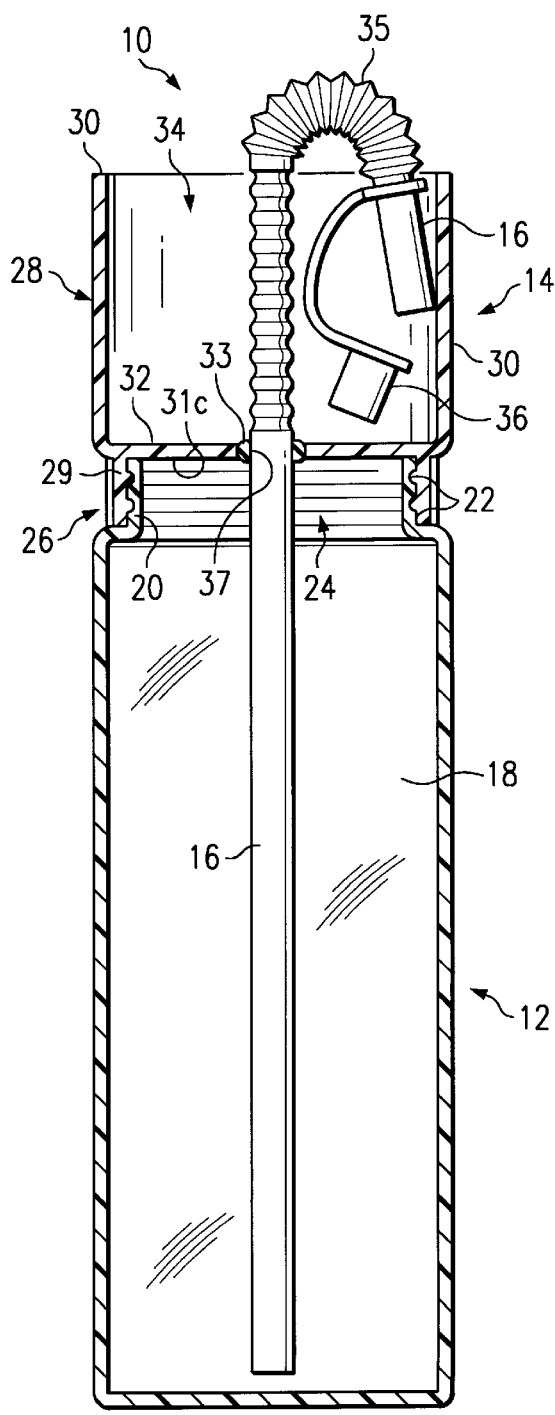

FIG. 3
FIG. 4
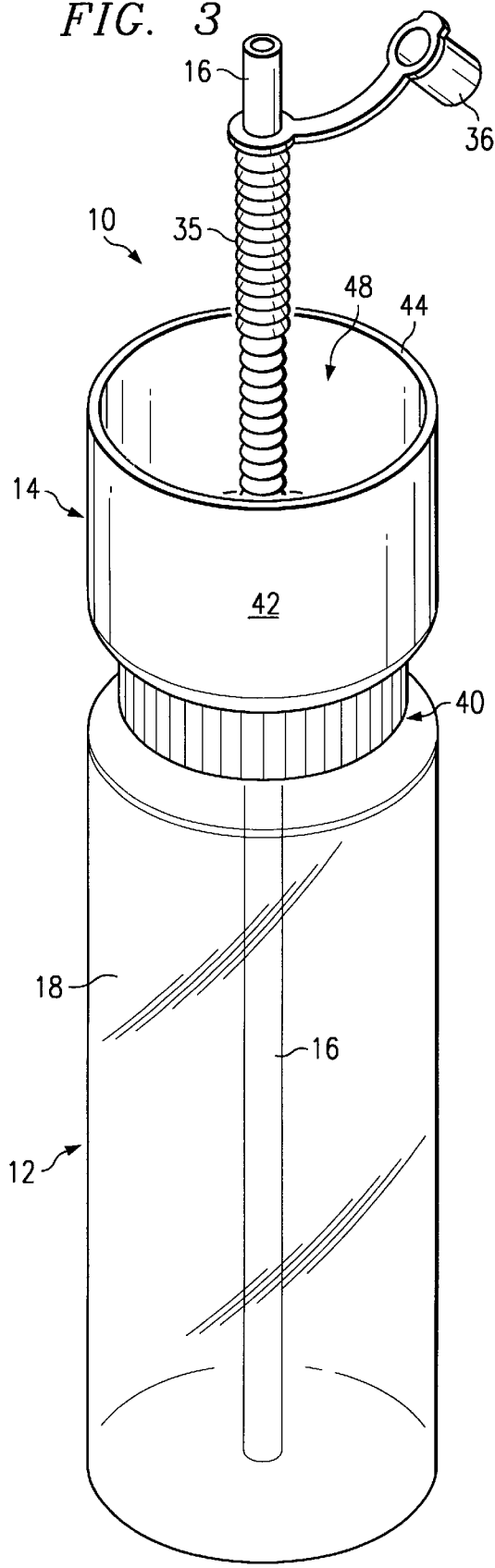
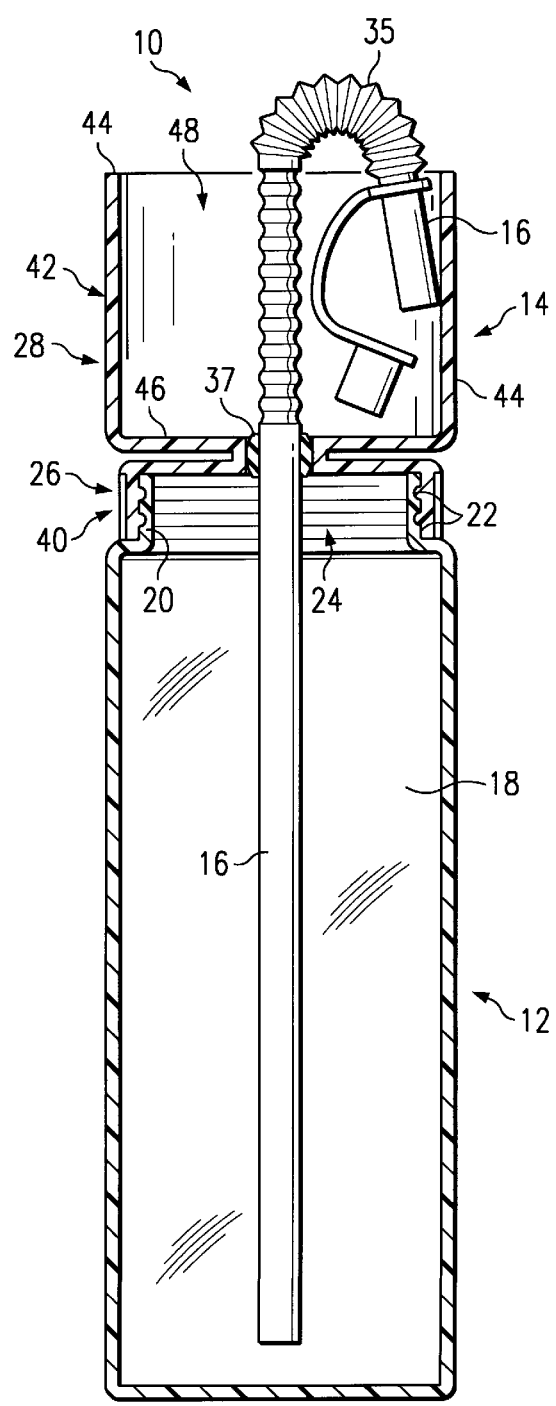

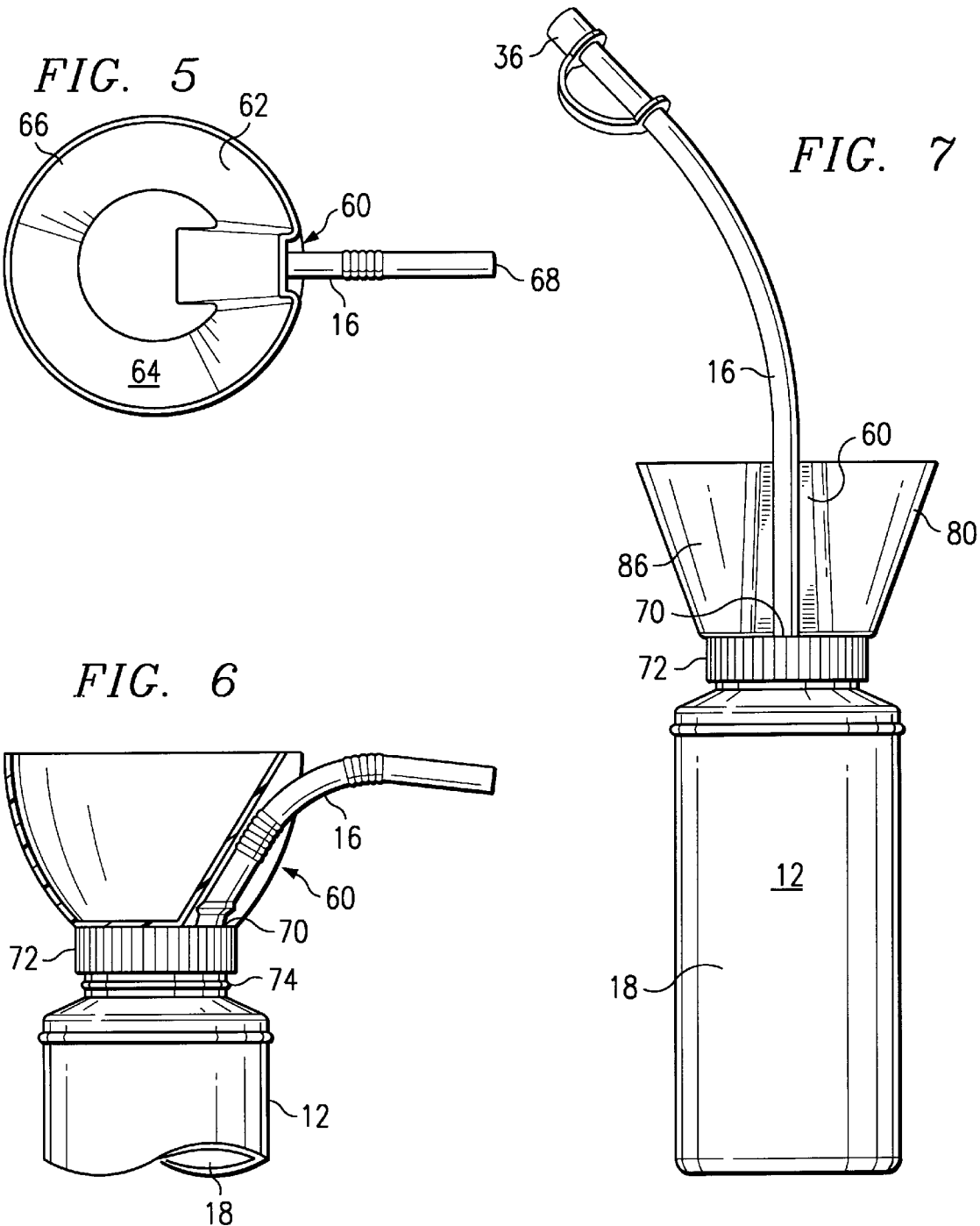

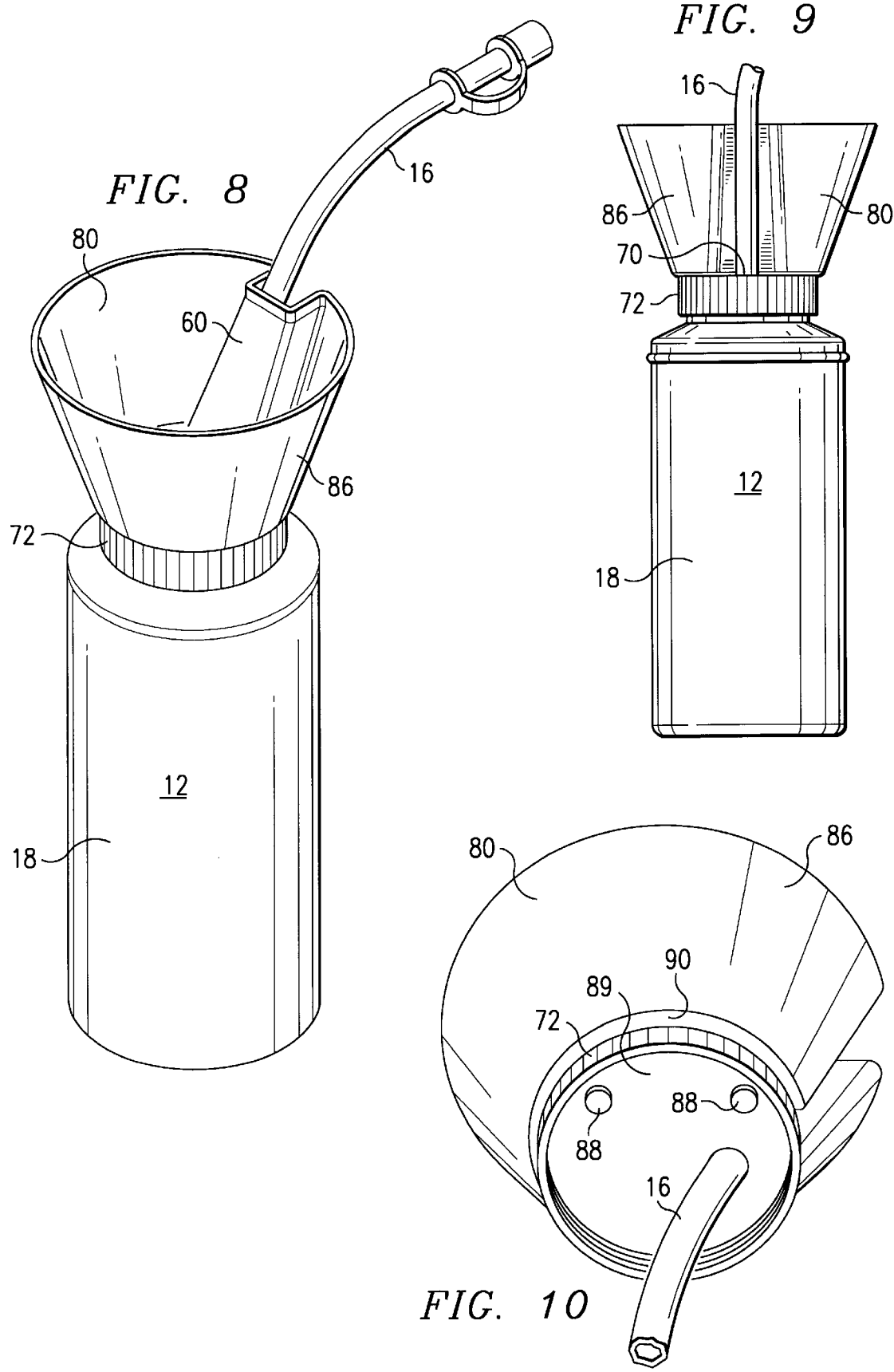

WATER BOTTLE FOR PETS AND THEIR OWNERS

CROSS REFERENCE TO RELATED APPLICATIONS

This application claims priority to provisional patent application Ser. No. 60/036,373, filed Jan. 22, 1997. That provisional application is fully incorporated by reference herein.

TECHNICAL FIELD OF THE INVENTION

This invention relates in general to water bottles and, more particularly, to a water bottle that can be used sanitarily by both a person and his or her pet.

BACKGROUND OF THE INVENTION

Water bottles are well known for use in providing a thirst-quenching liquid to a person exercising or otherwise undertaking strenuous physical activity, although such water bottles also are commonly used as drink containers by people not undertaking strenuous physical activity. For convenience, the term "water" is used herein to refer to water and any other thirst-quenching liquids, such as soft drinks, sports drinks and the like. Known portable water bottles typically comprise a plastic water container having a lid secured to and covering an upper opening of the container to substantially seal the container. A flexible straw, nipple or the like extends from the container through a central opening in the lid. Water can be obtained from the container for drinking by squeezing the container to force the water through the straw. For this reason, such a water bottle is commonly referred to as a "squeeze bottle".

Squeeze bottles provide a suitable source of thirst-quenching liquid for humans. However, it has become commonplace for people to exercise with their pets—dogs, in particular. For example, people who jog, run, hike, or even ride a bicycle for exercise may bring along a pet dog or other animal as a companion. This not only provides the pet with useful exercise, but also provides companionship for the exercising person, and in the case of large dogs, protection from other animals of both the human and non-human varieties.

With known water bottles, a person can easily quench his or her thirst during or after exercise or other strenuous physical activity. However, it is difficult to sanitarily provide water to an accompanying pet using known water bottles due to the manner in which such pets typically drink by lapping up liquids. Therefore, a need exists for a means to sanitarily provide a source of water or other thirst-quenching liquid for use both by people and their pets.

SUMMARY OF THE INVENTION

This invention provides a drinking bottle which can be used sanitarily by both a person and his or her pet animal, for example, during exercise or other strenuous physical activity.

A drinking bottle in accordance with a first embodiment of this invention comprises a liquid container, which may be identical to the flexible plastic containers presently used in known portable water bottles, and a lid member attached to the container and covering an upper opening therein. The lid member may be attached to the container via any sealing means which would enable the lid member to substantially seal the upper opening of the container. Such means can include a snapping mechanism, friction mechanism, or preferably, a threading mechanism.

As is conventional, the lid member has an opening through which a flexible straw extends into the liquid container for use by a person in obtaining water from the water bottle. The lid member has an upstanding wall that defines a liquid cup or reservoir surrounding the flexible straw separate from the liquid container. The liquid reservoir may be filled with liquid from the container by the user directing the upper end of the straw into the reservoir and forcing the liquid from the container through the straw. This provides an open reservoir of liquid from which a pet animal can drink without contaminating the straw or the liquid within the liquid container. Preferably, a suitable seal is provided around the opening in the lid assembly through which the straw extends so that contaminated liquid in the reservoir cannot leak back into the liquid container.

In addition to its use in providing liquid to pets, the reservoir may also be filled with liquid for consumption by the user or another person. Alternatively, liquid in the reservoir can be dumped or poured over a person (or pet) to provide cooling.

This invention further provides a combined reservoir and straw assembly which can be used with a conventional water bottle to convert the water bottle for use by both a person and his or her pet.

Moreover, it is within the scope of this invention to provide a cover for the reservoir, such as a snap-on cover, so that a person may use the reservoir for storage of tangible items. Such tangible items include those which one may want to store during exercise, including snacks, locker keys, money or the like. The cover will have a snapping lip complementary to a snapping edge on the reservoir.

Further in accordance with this invention, a cup and straw combination is provided comprising a cup defining a liquid reservoir, the cup having an aperture in its bottom wall. A tubular straw extends through the aperture in the cup, and a liquid-tight seal is provide between the cup and the straw. The cup and straw combination can be used with a conventional water bottle in place of a conventional straw to provide a water reservoir from which a pet can drink. If such a water reservoir is not needed at a later time, the cup and straw combination can be removed and replaced by a conventional tubular straw.

According to a further and preferred embodiment of the invention, a drink canister for humans and pets is provided which includes a vessel having an orifice in its top. A lid is adapted to be fitted onto the orifice of the vessel. A hole is formed through this lid and extends to the top surface of the lid. A cup or reservoir is affixed to the top surface of the lid. A tube is disposed to extend through the hole in the lid into the interior of the vessel. A portion of the tube extends upward from the hole in the lid and is disposed exterior to the sidewall of the cup. An upper end of the tube is disposed above the upper lip of the cup. The vessel includes means, such as a flexible sidewall, for selectively forcing the liquid contained in the vessel upward through the tube out of the upper end and into the cup, whereby liquid may be introduced into the cup for consumption by a pet. A technical advantage of this embodiment of the invention is that the straw or tube may be withdrawn or pushed aside, such that the pet has complete access to the entirety of the cup. Further, sanitation is improved in that the pet has less of a tendency to lick the straw.

Other aspects and advantages of this invention will become apparent from the following description and the accompanying drawings, in which like characters denote like parts.

BRIEF DESCRIPTION OF THE DRAWINGS

FIG. 1 is a perspective view of a first embodiment of a drinking bottle in accordance with this invention.

FIG. 2 is a vertical cross-sectional view of the drinking bottle of FIG. 1.

FIG. 3 is a perspective view of a second embodiment of a drinking bottle in accordance with this invention.

FIG. 4 is a vertical cross-sectional view of the drinking bottle of FIG. 3.

FIG. 5 is a top view of a third embodiment of a drinking bottle in accordance with this invention.

FIG. 6 is a part-elevational, part cross-sectional view of the drinking bottle of FIG. 5.

FIG. 7 is a perspective view of a fourth embodiment of a drinking bottle in accordance with this invention.

FIG. 8 is a more magnified perspective view of the drinking bottle of FIG. 7.

FIG. 9 is an elevational view of the embodiment shown in FIG. 7.

FIG. 10 is a bottom view of a reservoir/lid component of the embodiment shown in FIG. 7.

DETAILED DESCRIPTION OF ILLUSTRATED EMBODIMENT

Figure 11:
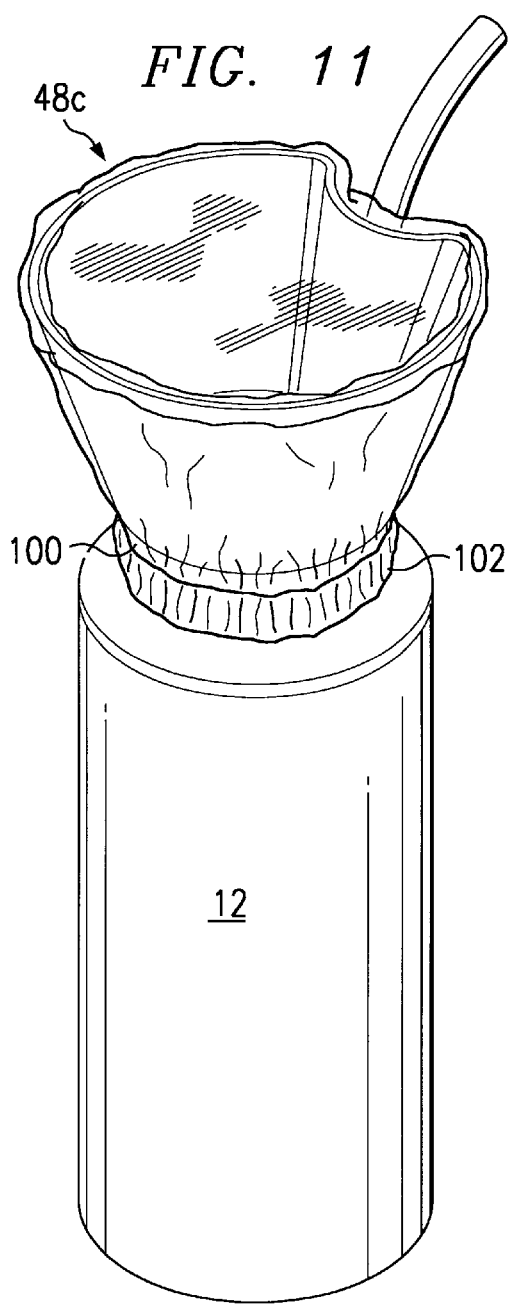
FIG. 11 is a perspective view of a cover as employed with this invention.

FIGS. 1 and 2 illustrate a first embodiment of a portable drinking bottle in accordance with this invention, generally designated 10, comprising a liquid container 12, a reservoir lid member 14, and a tubular straw 16. Tubular, as used herein, is meant to mean "hose-like" and not limited to any particular internal or external wall shapes, as long as the shape permits drinking by a human. The liquid container 12 may be identical to the liquid container of known portable water bottles and includes a one-piece hollow polyurethane plastic member defining a generally cylindrical liquid holding chamber 18, although the container 12 may have other shapes and may be formed from other materials. The container 12 has a cylindrical upper neck 20 that has external threads 22 and defines an opening 24 through which liquid can be introduced into a liquid holding chamber 18.

While each of the illustrated embodiments shows a "squeeze bottle" in which the liquid container 12 is manually deformed to collapse inwardly and to thereby urge fluid therein through straw 16, the invention may be employed with any liquid containing vessel that has a means to force liquid up the straw or tube 16 and into the reservoir. By way of example, the container 12 could have a rigid sidewall and a movable bottom connected to a push rod which would move upward against the sidewall interior, after the manner of a caulking gun or hypodermic syringe. Another way to force fluid through the tube would be the use of a pressurized gas in a hermetically sealed container 12. This would require an actuatable valve on the straw 16 or introductory conduit thereto, after the manner of a spray can, and could involve the use of prepackaged, disposable, pressurized cartridges as the container, to which the reservoir could be attached. In another nonillustrated embodiment, the user could use a provided manual pump, such as those found with garden sprayers and the containers of certain fluid consumer products such as glass cleaners, to pressurize the container interior.

In the first illustrated embodiment, the reservoir lid member 14 is preferably formed from a suitable polymeric material, such as polyurethane plastic, and includes a connector portion 26 and a reservoir portion 28. The connector portion 26 includes an internally threaded cylindrical wall 29 which can be threadedly connected to the external threads 22 of the neck 20 of the liquid container 12 to secure the reservoir lid member 14 to the liquid container 12 and to substantially seal the liquid holding chamber 18. As best seen in FIG. 1, preferably the outer surface 31 of the connector portion 26 has raised ridges or other friction surfaces 31a that facilitate gripping the outer surface 31 of the connector portion 26 for assembly or disassembly of the reservoir lid member 14 to or from the container 12. Alternatively, a snap-fit connection (not shown), in which the lid member snaps over the connector portion, may be used instead of a threaded connection.

The reservoir portion 28 of the lid member 14 has a vertically extending, generally cylindrical sidewall 30 and a generally circular bottom wall 32 which cooperate to define a liquid reservoir 34. The bottom wall 32 of the reservoir portion 28 of the reservoir lid member 14 has a central opening 33 through which the tubular straw 16 extends into the chamber 18 along the central axis 12a of the container 12. A portion 35 of the tubular straw 16 may be accordion-like so that the tubular straw 16 is articulable or plastically flexible, as shown in FIG. 2, to direct its upper end in a desired direction and keep it that way. In addition, the tubular straw 16 may include a conventional closure cap 36.

While it is generally preferred that the tubular straw 16 extend through the bottom wall 32 of the reservoir portion 28 of the reservoir lid member 14 via the central opening 33, it is within the scope of this invention for the tubular straw 16 to exit, for example, through any portion (such as a sidewall) of the container 12 or the connecting portion 26, with the proviso that the tubular straw 16 be capable of transporting a liquid from the container 12 to the liquid reservoir 34.

With reference particularly to FIG. 2, preferably a suitable liquid-tight seal 37 is provided between the tubular straw 16 and the opening 33 in the bottom wall 32 of the reservoir lid member 14. Preferably, the seal 37 is formed by a suitable epoxy material, but other suitable sealing materials, including those which do not permanently affix the straw 16 to the lid 14, may be employed. Such nonpermanently affixing materials include rubber O-rings, gaskets or the like. As evident, the use of a suitable epoxy material to form the seal 37 will permanently affix the tubular straw 16 to the reservoir lid 14.

The reservoir lid member 14 may be formed as a one-piece element, as shown in FIGS. 1 and 2, with the connector portion 26 being formed integrally with the reservoir portion 28.

Formed "integrally" is defined to mean that the reservoir portion 28 of the reservoir lid member 14 and the connector portion 26 are permanently connected. There generally is no limitation with respect to how the connector portion 26 and the reservoir portion 28 are connected other than that the means for connecting cannot prevent the instant invention from being used as a drinking bottle. The connector portion 26 and the reservoir portion 28 may be, for example, the product of two distinct pieces being connected by an adhesive. However, "formed integrally" is also meant to include a connector portion 26 and a reservoir portion 28 having been formed in a single mold, like a mold for plastics. Thus, the bottom wall 32 of the reservoir portion 28 and the ceiling wall 31c of the connector portion 26 may be one in the same.

Alternatively, the reservoir lid member 14 could also be formed by a separate connector portion 26 threadedly secured to the container 12 and separate reservoir portion 28, as shown in FIGS. 3 and 4. The separate connector portion 26 may comprise a conventional water bottle lid 40, and the reservoir portion 28 may comprise a separate cup 42 having a sidewall 44 and a bottom wall 46 defining a reservoir 48. The bottom wall 46 has an aperture therein through which a tubular straw 16 extends. A suitable seal 37 is provided around the tubular straw 16, as described above with regard to FIGS. 1 and 2, to prevent liquid in the reservoir 48 from leaking out of the reservoir 48. As shown in FIGS. 3 and 4, the portion of the tubular straw 16 projecting beneath the cup 42 can be inserted into an aperture in the conventional water bottle lid 40 and into the liquid holding chamber 18. The connector portion 26 and the reservoir portion 28 can be bonded together in a suitable fashion or they may remain separate components and held together by the tubular straw 16. In the latter case, the combined reservoir portion 28 and tubular straw 16 can be used in place of the straw of a conventional water bottle, thereby converting the conventional water bottle into a water bottle in accordance with this invention.

FIGS. 5 and 6 show a further and more preferred embodiment of the invention. In this embodiment, a channel or path 60 is formed in the reservoir or cup 62 so that a preferably flexible straw or tube 16 may be inserted into the chamber 18. The cup 62 has an interior surface or sidewall 64 bounding a volume 66 into which liquid may be introduced. A top end 68 of tube 16 is directed by the user to a point over, or preferably in, cup 62 to place liquid in the cup 62. The user then redirects the straw end 68 to the position shown. Because the tube 16 is disposed in a path between chamber 18 and a top end 68 which is entirely exterior to the volume 66, the tube 16 does not interfere with access by the pet and the entirety of the volume 66 is available for drinking by the pet.

In this embodiment, the straw or tube 16 enters the chamber 18 through a hole 70 in a screw-on lid 72. A lower end of the channel 60 leaves the hole 70 unoccluded. The tube 16 may then be directed in a path which is oriented upward and outward, as shown. The channel 60 may take any convenient or aesthetically pleasing shape; in an alternative embodiment (not shown), the channel 60 may take the form of a closed tube in which the straw 16 is inserted.

The cup 62 of FIGS. 5 and 6 is curved upward and outward to permit more surface area to the pet than would otherwise be possible. It is affixed by any of several conventional means, such as adhesives or heat riveting, to a top surface of the lid 72. Preferably, a bottom end of the channel 60 is made somewhat larger than the hole 70 to prevent misalignment problems during assembly. As in previous embodiments, lid 72 can be screw-threaded to the container neck 74, or may be snapped into place over an external margin thereof (not shown). In an alternative embodiment, the cup 62 and the lid 72 may be molded as a single piece. In another embodiment, the tube 16 may be introduced through a hole (not shown) in the sidewall of container 12 to chamber 18, avoiding the lid 72 altogether.

FIGS. 7–10 show an embodiment related to the one illustrated in FIGS. 5–6. In this embodiment, cup 62 has been replaced with a larger, frustoconically shaped cup 80 that has an even larger surface area from which the pet may drink. Except for a channel 60 which, as before, permits the introduction of the tube 16 into a hole in the lid 72, a base 84 of the cup or reservoir 80 laps over the lid 72 in all directions, and the frustoconical sidewall 86 begins from a point below the top surface of the lid 72. The only effective limits on the size of cup 80 are overall bulkiness and inconvenience to the carrier, and the volume of chamber 18; a cup having a volume larger than that of the bottle is too large to be completely useful.

As shown in FIGS. 7–9, the bottle 12 may be printed with suitable advertising indicia.

FIG. 10 shows the cup 80, the lid 72 and the tube 16 disassembled from the bottle, in a view which best shows a plurality of welds or heat rivets 88 (one is occluded by tube 16) that are initially molded as portions of cup 80, inserted through respective holes in the lid 72, and then spot-heated with a suitable heating element or iron to rivet the cup 80 to the cup 80 by spreading out over a bottom surface 89 of the lid 72. FIG. 10 also shows the downward-tending, overlapping, circumferential margin 90 from which sidewall 86 upwardly extends. The margin 90 forms a shallow receptacle into which the lid 72 may be registered prior to heat riveting. Alternatively, lid 72 and cup 80 may be molded as a single piece, which would obviate the equipment and labor involved in joining pieces 72 and 80 together.

Figure 12:
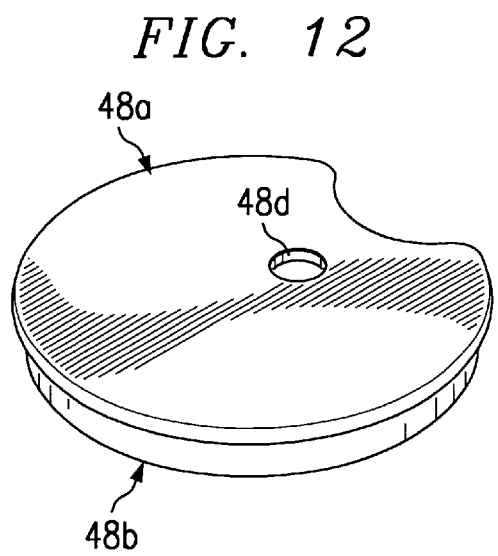
FIG. 12 is a snap-on cover for use with the embodiment shown in FIG. 7.

FIG. 11 shows a first form of a top closure 48c which may be used in connection with the invention. Closure 48c is in the form of a flexible plastic membrane with a margin 100 gathered by a suitable elastic band 102, after the fashion of a shower cap. As snapped over cup 80 and interiorly of straw 16, cup 80 and closure 48c form a container suitable for a car key, one or more coins, medications, pet treats, water additives, or other small articles which joggers and walkers are apt to carry. FIG. 12 shows a further form of a cup closure 48a, which is in the nature of a flexible but solid lid that is snapped over an outwardly extending top circumferential margin of the cup provided for this purpose. Lid 48c may be formed of polyurethane, rubber or the like and should be slightly elastic.

In use, the water bottle 10 can be readily used in a sanitary fashion to provide thirst-quenching liquid to both a person and a pet. A person drinks liquid from the water bottle 10 in a conventional manner by placing the tubular straw 16 in his or her mouth and squeezing the container 12 to force liquid from the chamber 18 through the tubular straw 16. To provide liquid to the animal, the free end of the tubular straw 16 is first directed downwardly into the reservoir 34. Then, the user squeezes the container 12 to force liquid from the container 12 into the reservoir lid member 14. Finally, the tubular straw 16 is returned to its upright position, and the water bottle 10 is presented to the animal, which can drink liquid from the reservoir 34 without the risk of contaminating the tubular straw 16 or the liquid held within the container 12. Such sanitary use by the pet animal is made possible by providing a separate body of liquid in the reservoir 34 from which the pet animal can drink. The tubular straw 16 is not contaminated by the animal because its end is away from the reservoir 34 and not contacted by the animal. In addition, no liquid from the reservoir 34 is permitted to leak back into the container 12 around the tubular straw 16 due to the provision of the seal 37 between the tubular straw 16 and the bottom wall 32 of the reservoir lid member 14.

While it is generally preferred that the container is squeezed in order to force liquid through the straw, it is within the scope of this invention to employ a non-flexible/rigid container in lieu of a squeezable container and/or force liquid through the straw with a pressurizing (e.g., pumping) device. Such a pressurizing device may be part of the straw, the container or both.

Although the many embodiments of this invention have been described, it will be understood that within the purview of the invention various changes may be made within the scope of the following claims.

I claim:

1. A water bottle for humans and animals, comprising:

a vessel defining a liquid holding chamber, a closeable orifice formed in the vessel for introducing a fluid into the holding chamber;

a cup affixed to the vessel and having an interior surface defining a cup volume, an upper limit of the cup volume including a large open area adaptable to be accessed by a nonhuman animal;

a tube disposed to extend from the fluid holding chamber to the upper limit of the vessel, an upper end of the tube positionable in the cup volume or above the open area of the cup, means for selectively forcing liquid contained in the vessel upward through the tube out of the upper end of the tube and into the cup, whereby liquid may be introduced into the cup for consumption by a pet, wherein said means for selectively forcing liquid includes the tube being plastically flexible, such that a user may bend the tube to dispose the upper end of the tube over or in the cup.

2. A water bottle for humans and animals, comprising:

a vessel defining a liquid holding chamber, a closeable orifice formed in the vessel for introducing a fluid into the holding chamber;

a cup affixed to the vessel and having an interior surface defining a cup volume, an upper limit of the cup volume including a large open area adaptable to be accessed by a nonhuman animal;

a tube disposed to extend from the fluid holding chamber to the upper limit of the vessel, an upper end of the tube positionable in the cup volume or above the open area of the cup, means for selectively forcing liquid contained in the vessel upward through the tube out of the upper end of the tube and into the cup, whereby liquid may be introduced into the cup for consumption by a pet, wherein the cup has an exterior sidewall with a channel formed to extend radially inwardly therefrom, the channel forming a path for the tube which is exterior to the interior surface of the cup.

3. The water bottle of claim 2, wherein the channel is open in a radial exterior direction.

4. A combination lid and cup for use with a drinking bottle having an interior chamber and an orifice to the chamber, comprising:

a lid member adapted to be releasably secured over the orifice of the bottle, a tube hole formed in the lid member for receiving a tube, a first end of the tube adaptable to be disposed in the chamber of the bottle; and a cup member mounted on the lid member, an interior sidewall of the cup member defining a reservoir volume, a path formed by the cup member to permit the extension of the tube upward from the hole in the lid member, an upper end of the tube adaptable to be placed over or adjacent to the reservoir volume.

5. The combination lid and cup of claim 4, wherein the tube path is a channel formed in the cup member external to the interior sidewall of the cup member, a lower end of the channel disposed over the tube hole in the lid member.

6. The combination lid and cup of claim 4, wherein the cup member and lid member are formed separately and are then bonded together.

7. The combination lid and cup of claim 4 wherein the lid member is securable to the bottle by screw threads.

* * * * *